(12) United States Patent  (10) Patent No.:   US 9,252,830 B2
Bremer et al.  (45) Date of Patent:   Feb. 2, 2016

(54) COMMUNICATIONS DEVICE WITH MULTIPLE RECEIVE AND TRANSMIT PATHS AND RELATED METHODS

(75) Inventors: Brian Bremer, Arlington Heights, IL (US); Jyothsna Kunduru, Plano, TX (US)

(73) Assignee: BlackBerry Limited, Waterloo, ON (CA)

( * ) Notice: Subject to any disclaimer, the term of this patent is extended or adjusted under 35 U.S.C. 154(b) by 583 days.

(21) Appl. No.: 13/227,659

(22) Filed: Sep. 8, 2011

(65) Prior Publication Data

US 2012/0147789 A1  Jun. 14, 2012

Related U.S. Application Data

(60) Provisional application No. 61/421,991, filed on Dec. 10, 2010.

(51) Int. Cl.
*H04B 1/38* (2015.01)
*H04B 1/403* (2015.01)
*H04B 1/00* (2006.01)
*H04B 1/525* (2015.01)

(52) U.S. Cl.
CPC .............. *H04B 1/406* (2013.01); *H04B 1/0053* (2013.01); *H04B 1/0057* (2013.01); *H04B 1/525* (2013.01)

(58) Field of Classification Search
CPC .... H04B 1/0053; H04B 1/0057; H04B 1/406; H04B 1/525
USPC .............................. 370/277, 280; 455/83, 90.2
See application file for complete search history.

(56) References Cited

U.S. PATENT DOCUMENTS

| | | | |
|---|---|---|---|
| 6,343,221 B1 | 1/2002 | Toda et al. | |
| 6,903,606 B1 | 6/2005 | Yan et al. | 330/9 |
| 7,587,041 B2 | 9/2009 | Blair | 379/266.1 |
| 2002/0049075 A1 | 4/2002 | Takagi | |
| 2006/0030355 A1 | 2/2006 | Kemmochi et al. | |
| 2006/0194550 A1* | 8/2006 | Block et al. | 455/78 |

(Continued)

FOREIGN PATENT DOCUMENTS

EP  0923198  6/1999
EP  1381163  1/2004

(Continued)

OTHER PUBLICATIONS

"Radio interference," Nextel Communications, Dec. 6, 2010, 1 page.

*Primary Examiner* — Pao Sinkantarakorn
*Assistant Examiner* — Richard Chang
(74) *Attorney, Agent, or Firm* — Guntin & Gust, PLC; Jay H. Anderson

(57) ABSTRACT

A communications device may include a first transmit path having a first band pass filter operating at a first frequency band having a first bandwidth, and a second transmit path having a second band pass filter operating at a second frequency band having a second bandwidth. The second frequency band may be adjacent the first frequency band and the second bandwidth may be less than the first bandwidth. The communications device may include a third receive path operating at a third frequency band having a third bandwidth, and a fourth receive path operating at a fourth frequency band having a fourth bandwidth. The fourth frequency band may be adjacent the third frequency band, and the fourth bandwidth may be less than the third bandwidth.

20 Claims, 4 Drawing Sheets

(56) References Cited

U.S. PATENT DOCUMENTS

| | | |
|---|---|---|
| 2007/0161358 A1 | 7/2007 | Bogdan |
| 2009/0180403 A1 | 7/2009 | Tudosoiu |
| 2010/0287594 A1* | 11/2010 | Zhang ............................ 725/62 |
| 2011/0075593 A1* | 3/2011 | Chen et al. .................... 370/280 |

FOREIGN PATENT DOCUMENTS

| | | |
|---|---|---|
| EP | 1396939 | 3/2004 |
| EP | 1492244 | 12/2004 |
| GB | 2347292 | 8/2000 |
| WO | 0227953 | 4/2002 |

* cited by examiner

US 9,252,830 B2

COMMUNICATIONS DEVICE WITH MULTIPLE RECEIVE AND TRANSMIT PATHS AND RELATED METHODS

RELATED APPLICATION

This application is based upon prior filed copending provisional application Ser. No. 61/421,991 filed Dec. 10, 2011, the entire subject matter of which is incorporated herein by reference in its entirety.

TECHNICAL FIELD

This application relates to the field of communications, and more particularly, to wireless communications systems and related methods.

BACKGROUND

Cellular communication systems continue to grow in popularity and have become an integral part of both personal and business communications. Cellular telephones allow users to place and receive phone calls most anywhere they travel. Moreover, as cellular telephone technology is advanced, so too has the functionality of cellular devices. For example, many cellular devices now incorporate Personal Digital Assistant (PDA) features such as calendars, address books, task lists, calculators, memo and writing programs, etc. These multi-function devices usually allow users to wirelessly send and receive electronic mail (email) messages and access the internet via a cellular network and/or a wireless local area network (WLAN), for example.

Cellular devices have radio frequency (RF) processing circuits and receive or transmit radio communications signals typically using modulation schemes. The typical cellular device may have multiple transmit and receive pathways from the antenna to a digital signal processor (DSP). In particular, each signal pathway may comprise a filter to help isolate the desired frequency band from extraneous electromagnetic signals, for example, noise and interference.

Nevertheless, as frequency bands change because of regulatory reasons, expansion, etc., it may be problematic to change the components of the cellular device to utilize the new bandwidth. For example, redesigning filters and power amplifiers to use the new bandwidth may incur greater complexity and cost.

DETAILED DESCRIPTION OF THE PREFERRED EMBODIMENTS

Figure 1:
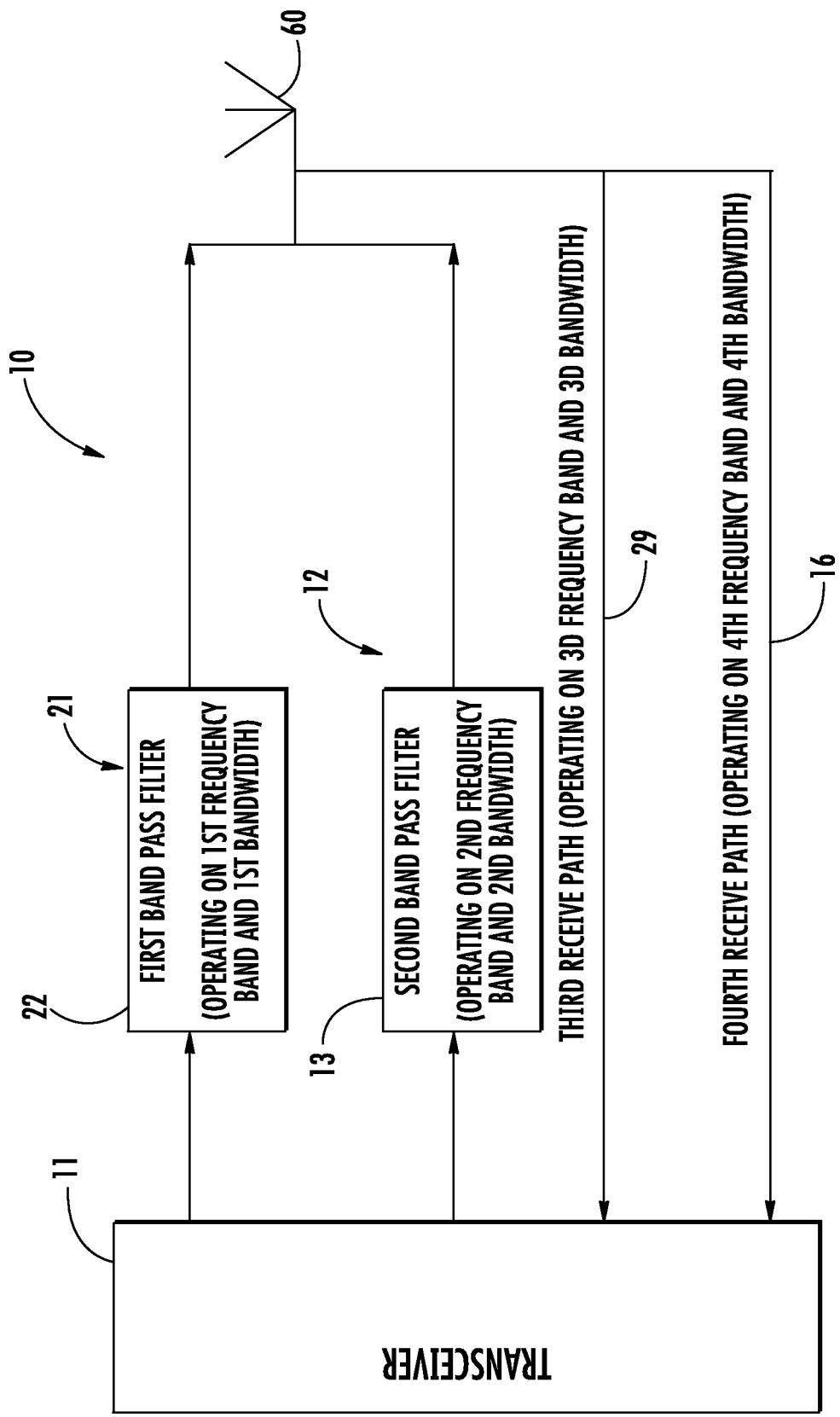
FIG. 1 is a schematic block diagram of an example embodiment of a communications device.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a communications device is described herein and may include a first transmit path comprising a first band pass filter operating at a first frequency band having a first bandwidth, and a second transmit path comprising a second band pass filter operating at a second frequency band having a second bandwidth. The second frequency band may be adjacent the first frequency band, and the second bandwidth may be less than the first bandwidth. The communications device may also include a third receive path operating at a third frequency band having a third bandwidth, and a fourth receive path operating at a fourth frequency band having a fourth bandwidth, the fourth frequency band being adjacent the third frequency band and the fourth bandwidth being less than the third bandwidth.

More specifically, the communications device may also include an antenna, and a first duplex band pass filter coupling the first transmit path and the third receive path to the antenna. The first duplex band pass filter may be configured to selectively pass the first frequency band for the first transmit path and the third frequency band for the third receive path.

Also, the communications device may comprise a second duplex band pass filter coupling the second transmit path and the fourth receive path to the antenna. The second duplex band pass filter may be configured to selectively pass the second frequency band for the second transmit path and the fourth frequency band for the fourth receive path.

In some embodiments, the communications device may further comprise a switch configured to selectively couple the first and second duplex band pass filters to the antenna. The communications device may further comprise a second antenna, and a fifth receive path coupled to the second antenna. For example, the fifth receive path may comprise a band pass filter configured to pass a combined bandwidth of the third and fourth frequency bands.

Additionally, the first and third bandwidths may be the same, and the second and fourth bandwidth may also be the same. For example, the first and third frequency bands may respectively comprise 1850-1910 MHz and 1930-1990 MHz, and the second and fourth frequency bands may respectively comprise 1910-1915 MHz and 1990-1995 MHz. In some embodiments, the first and third frequency bands may be associated with a personal communications service (PCS).

Another aspect is directed to a method of operating a communications device. The method may comprise using a first transmit path, the first transmit path comprising a first band pass filter operating at a first frequency band having a first bandwidth, and using a second transmit path, the second transmit path comprising a second band pass filter operating at a second frequency band having a second bandwidth. The second frequency band may be adjacent the first frequency band, and the second bandwidth may be less than the first bandwidth. The method may also include using a third receive path, the third receive path comprising a third band pass filter operating at a third frequency band having a third bandwidth, and using a fourth receive path, the fourth receive path comprising a fourth band pass filter operating at a fourth frequency band having a fourth bandwidth. The fourth frequency band may be adjacent the third frequency band, and the fourth bandwidth may be less than the third bandwidth.

Figure 3:
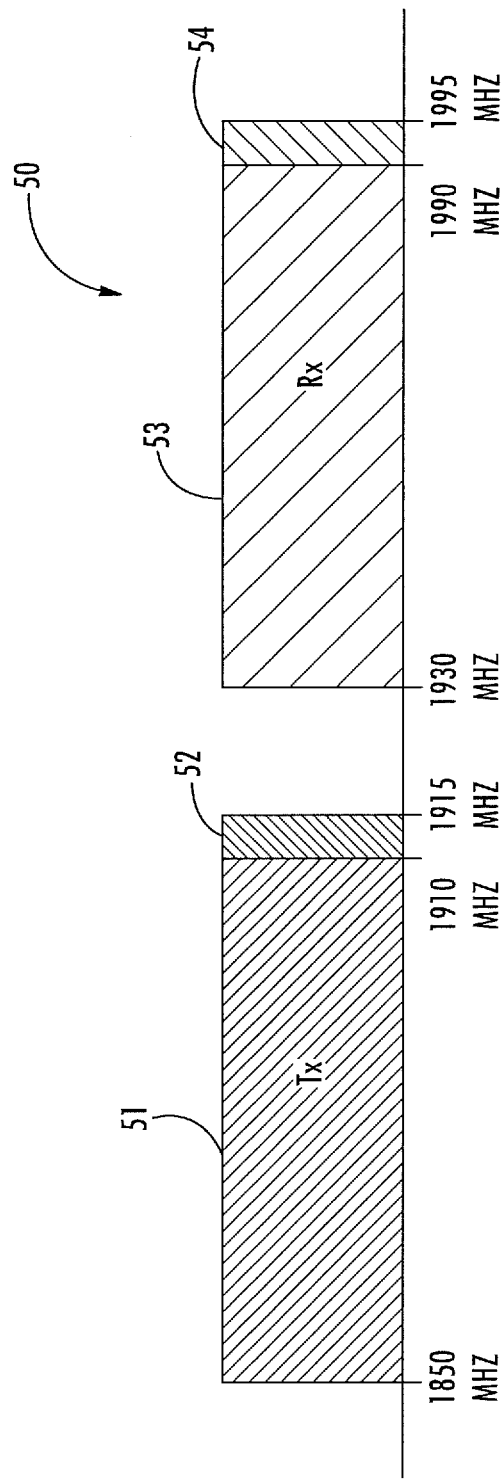
FIG. 3 is a schematic diagram of the spectrum usage in the communications device of FIG. 2.

Referring now to FIGS. 1 and 3, a communications device 10 according to the present disclosure is now described. The communications device 10 illustratively includes a first transmit path 21, a second transmit path 12, a third receive path 29, a fourth receive path 16, and a transceiver 11 coupled to each of these paths. The first transmit path 21 illustratively includes a first band pass filter 22 operating at a first frequency band 51 having a first bandwidth. The second transmit path 12 illustratively includes a second band pass filter 13 operating at a second frequency band 52 having a second bandwidth.

Figure 2:
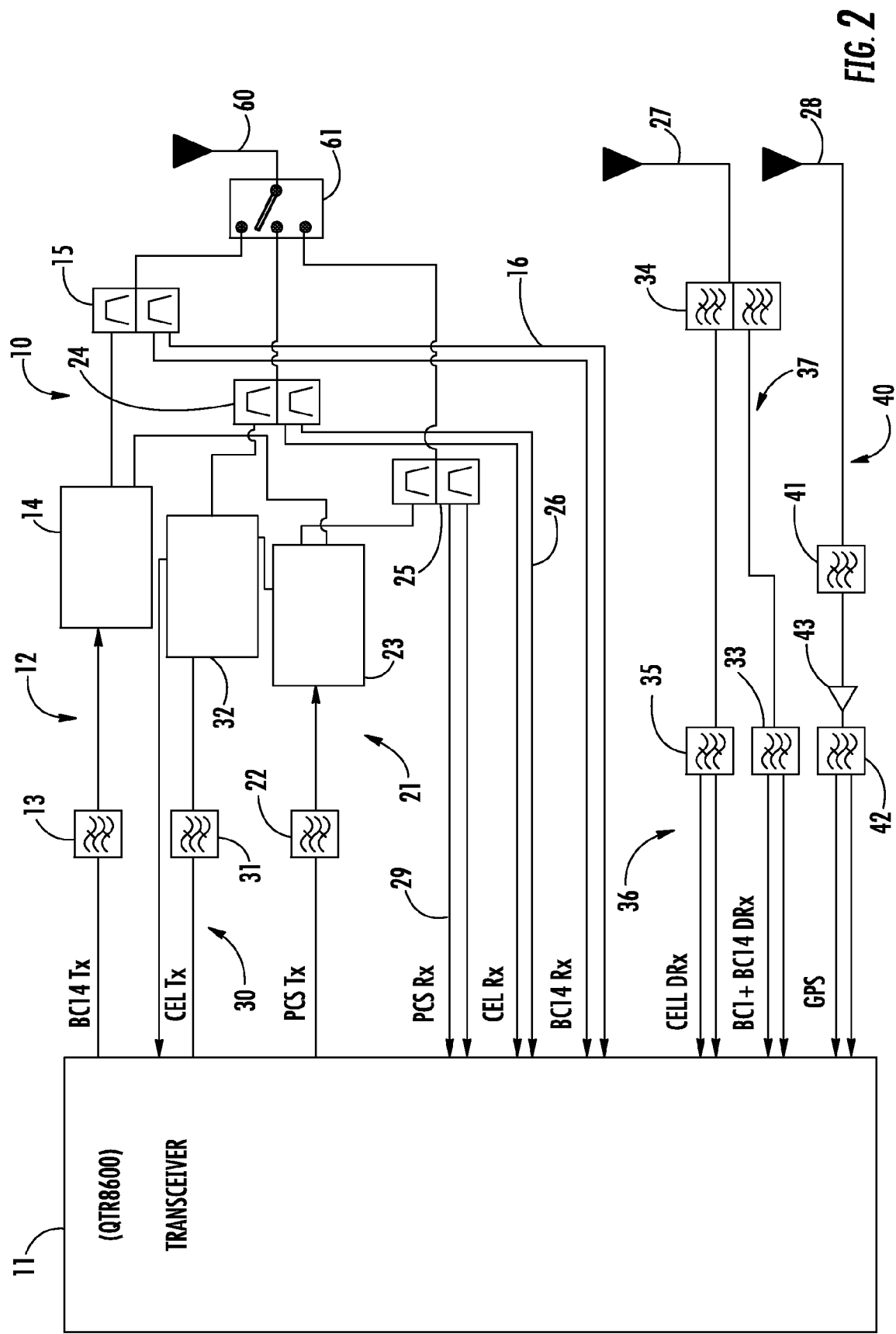
FIG. 2 is a detailed schematic block diagram of an example embodiment of a communications device.

Referring now additionally to FIG. 2, the communications device 10 is now described in detail. The transceiver 11 is illustratively shown as a QTR8600 chipset, as available from the Qualcomm Corporation of San Diego, Calif., but may comprise any capable transceiver chipset. Moreover, the communications device 10 may further comprise a digital signal processor (not shown) upstream of the transceiver 11.

The first transmit path 21 further illustratively includes a first power amplifier 23 coupled upstream of the first band pass filter 22. The second transmit path 12 illustratively includes a second power amplifier 14 coupled upstream of the second band pass filter 13. The second frequency band 52 is illustratively adjacent the first frequency band 51, and the second bandwidth may be less than the first bandwidth.

The third receive path 29 illustratively operates at a third frequency band 53 having a third bandwidth, and the fourth receive path 16 illustratively operates at a fourth frequency band 54 having a fourth bandwidth. The fourth frequency band 54 is illustratively adjacent the third frequency band 53, and the fourth bandwidth is less than the third bandwidth. For example, as shown in FIG. 3, the first and third frequency bands 51, 53 respectively comprise the 1850-1910 MHz band and the 1930-1990 MHz band, and the second and fourth frequency bands 52, 54 respectively comprise the 1910-1915 MHz band and the 1990-1995 MHz band.

As will be appreciated by those skilled in the art, the spectrum 50 of the illustrated communications device 10 is associated with the PCS, but other frequency bands and service protocols may be used. Additionally, the first and third bandwidths are illustratively the same, and the second and fourth bandwidths are illustratively also the same. In particular, the second and fourth frequency bands 52, 54 may be associated with the 5 MHz "Block G" (BC14) of the PCS, and the first and third frequency bands 51, 53 may be associated with the typical PCS bands (BC1).

Additionally, the communications device 10 illustratively includes an antenna 60 (e.g. triband antenna), a switch 61 coupled thereto, and a first duplex band pass filter 25 coupling the first transmit path 21 and the third receive path 29 to the antenna. The first duplex band pass filter 25 may be configured to selectively pass the first frequency band 51 for the first transmit path 21 and the third frequency band 53 for the third receive path 29.

Also, the communications device 10 illustratively includes a second duplex band pass filter 15 coupling the second transmit path 12 and the fourth receive path 16 to the switch 61 and the antenna 60. The second duplex band pass filter 15 may be configured to selectively pass the second frequency band 52 for the second transmit path 12 and the fourth frequency band 54 for the fourth receive path 16.

The communications device also illustratively includes a second antenna 27 (e.g. dual band antenna), and a fifth receive path 37 coupled between the second antenna and the transceiver 11. The fifth receive path illustratively includes a band pass filter 33 configured to pass a combined bandwidth of the third and fourth frequency bands 53-54. As will be appreciated by those skilled in the art, this fifth receive path 37 provides receive diversity to the third and fourth receive paths 29, 16.

The communications device 10 also illustratively includes a sixth transmit path 30 comprising a band pass filter 31 and a power amplifier 32 coupled upstream thereto, a seventh receive path 26, and a third duplex band pass filter 24. The sixth and seventh paths 30, 26 illustratively operate at cellular frequencies to provide voice services, and are coupled to the switch 61 via the third duplex band pass filter 24, which is configured to pass a sixth frequency band for the sixth transmit path 30 and a seventh frequency band for the seventh receive path 26.

The switch 61 configured to selectively couple the first, second, and third duplex band pass filters 15, 24-25 to the antenna 60 depending on the type of communication signals being received and transmitted. The communications device also illustratively includes an eighth cellular receive path 36 comprising a band pass filter 35 and for providing diversity to the seventh receive path 26. The communications device 10 also illustratively includes a band pass filter 34 coupling the diversity fifth receive path 37 and the eighth cellular receive path 36 to the second antenna 27.

Lastly, the communications device 10 also illustratively includes a global positioning system (GPS) antenna 28, and a ninth receive path 40 comprising two band pass filters 41-42, and a power amplifier 43 coupled thereto for providing GPS receiver input to the transceiver 11.

Advantageously, in PCS embodiments, the breaking up of the PCS transmit and receive paths into four paths 12, 21, 16, 29 may provide for easier design. In particular, the associated band pass filters 13, 22 and the duplex band pass filters 15, 25 are provided with larger guard bands and more roll off space. Indeed, the communications device 10 provides high isolation of the desired frequencies for each transmit/receive path, thereby providing excellent radio frequency (RF) performance. The Block G frequency band of the PCS is separated into its own transmit and receive paths, thereby allowing the communications device 10 to use typical filter (e.g. SAW filter) and amplifier components for the typical PCS band paths, thereby reducing the complexity and cost of the communications device. This is in contrast to typical communications devices, which may operate the Block G frequencies along with the typical PCS band frequencies in the same transmit and receive paths, which may lead to rather complex filtering components.

Example components of a mobile wireless communications device 1000 that may be used in accordance with the above-described embodiments are further described below with reference to FIG. 4. Example mobile wireless communications devices may include portable or personal media players (e.g., music or MP3 players, video players, etc.), remote controls (e.g., television or stereo remotes, etc.), portable gaming devices, portable or mobile telephones, smartphones, tablet computers, etc.

The device 1000 illustratively includes a housing 1200, a keyboard or keypad 1400 and an output device 1600. The output device shown is a display 1600, which may comprise a full graphic liquid crystal display (LCD). Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 4:
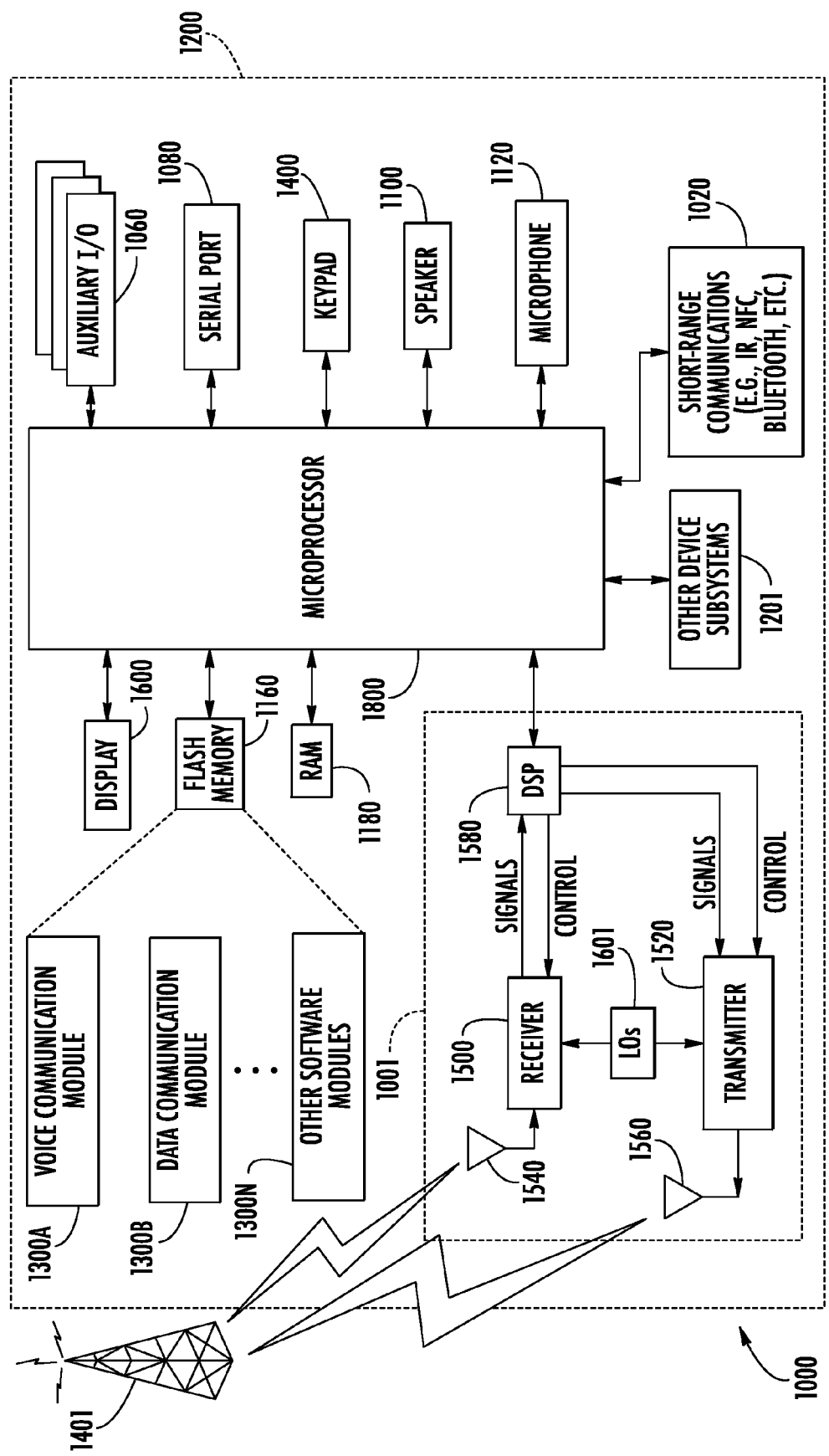
FIG. 4 is a schematic block diagram illustrating example components of a mobile wireless communications device that may be used with the communications devices of FIGS. 1 and/or 2.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TACT™ or General Packet Radio Service (GPRS) mobile data communications networks, and also designed to operate with any of a variety of voice communications networks, such as Advanced Mobile Phone System (AMPS), time division multiple access (TDMA), code division multiple access (CDMA), Wideband code division multiple access (W-CDMA), personal communications service (PCS), GSM (Global System for Mobile Communications), enhanced data rates for GSM evolution (EDGE), etc. Other types of data and voice networks, both separate and integrated, may also be utilized with the mobile device 1000. The mobile device 1000 may also be compliant with other communications standards such as 3GSM, 3rd Generation Partnership Project (3GPP), Universal Mobile Telecommunications System (UMTS), 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a NFC sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A communications device comprising:
a first transmit path comprising a first band pass filter operating at a first frequency band having a first bandwidth;
a second transmit path comprising a second band pass filter operating at a second frequency band having a second bandwidth, the second frequency band being directly adjacent to the first frequency band and the second bandwidth being less than the first bandwidth, the first and second frequency bands comprising a combined transmission frequency band;
a first receive path operating at a third frequency band having a third bandwidth;
a second receive path operating at a fourth frequency band having a fourth bandwidth, the fourth frequency band being directly adjacent to the third frequency band and the fourth bandwidth being less than the third bandwidth, the third and fourth frequency bands comprising a combined reception frequency band,
wherein the combined transmission frequency band and the combined reception frequency band are isolated from each other by a bandwidth greater than that of the second frequency band or the fourth frequency band; and
a processor coupled to said first and second transmit paths and said first and second receive paths, said processor configured to select the first and second frequency bands in the corresponding separate transmit paths for routing and combining respective spectral parts into a single transmit signal, and select the third and fourth frequency bands in the corresponding separate receive paths for routing and combining respective spectral parts into a single receive signal.

2. The communications device of claim 1 further comprising:
an antenna; and
a first duplex band pass filter coupling said first transmit path and said first receive path to said antenna, said first duplex band pass filter configured to selectively pass the first frequency band for said first transmit path and the third frequency band for said first receive path.

3. The communications device of claim 2 further comprising:
a second duplex band pass filter coupling said second transmit path and said second receive path to said antenna, said second duplex band pass filter configured to selectively pass the second frequency band for said second transmit path and the fourth frequency band for said second receive path.

4. The communications device of claim 3 further comprising a switch configured to selectively couple said first and second duplex band pass filters to said antenna.

5. The communications device of claim 1 further comprising a second antenna, and a third receive path coupled to said second antenna; and wherein said third receive path comprises a band pass filter configured to pass a combined bandwidth of the third and fourth frequency bands.

6. The communications device of claim 1 wherein the first and third bandwidths are the same; and wherein the second and fourth bandwidths are the same.

7. The communications device of claim 6 wherein the first and third frequency bands respectively comprise 1850-1910 MHz and 1930-1990 MHz.

8. The communications device of claim 6 wherein the second and fourth frequency bands respectively comprise 1910-1915 MHz and 1990-1995 MHz.

9. The communications device of claim 1 wherein the first and third frequency bands are associated with a personal communications service (PCS).

10. A communications device comprising:
a first transmit path comprising a first band pass filter operating at a first frequency band having a first bandwidth, the first frequency band being associated with a personal communications service (PCS);
a second transmit path comprising a second band pass filter operating at a second frequency band having a second bandwidth, the second frequency band being directly adjacent to the first frequency band and the second bandwidth being less than the first bandwidth, the second frequency band being associated with Block G of the PCS, the first and second frequency bands comprising a combined transmission frequency band;
a first receive path operating at a third frequency band having a third bandwidth;
a second receive path operating at a fourth frequency band having a fourth bandwidth, the fourth frequency band being directly adjacent to the third frequency band and the fourth bandwidth being less than the third bandwidth, the third frequency band being associated with the PCS, the third and fourth frequency bands comprising a combined reception frequency band,
wherein the combined transmission frequency band and the combined reception frequency band are isolated from each other by a bandwidth greater than that of the second frequency band or the fourth frequency band;
an antenna;
a first duplex band pass filter coupling said first transmit path and said first receive path to said antenna, said first duplex band pass filter configured to selectively pass the first frequency band for said first transmit path and the third frequency band for said first receive path; and
a processor coupled to said first and second transmit paths and said first and second receive paths, said processor configured to select the first and second frequency bands in the corresponding separate transmit paths for routing and combining respective spectral parts into a single PCS transmit signal, and select the third and fourth frequency bands in the corresponding separate receive paths for routing and combining respective spectral parts into a single PCS receive signal.

11. The communications device of claim 10 further comprising:
a second duplex band pass filter coupling said second transmit path and said second receive path to said antenna, said second duplex band pass filter configured to selectively pass the second frequency band for said second transmit path and the fourth frequency band for said second receive path.

12. The communications device of claim 11 further comprising a switch configured to selectively couple said first and second duplex band pass filters to said antenna.

13. The communications device of claim 10 further comprising a second antenna, and a third receive path coupled to said second antenna; and wherein said third receive path comprises a band pass filter configured to pass a combined bandwidth of the third and fourth frequency bands.

14. The communications device of claim 10 wherein the first and third bandwidths are the same; and wherein the second and fourth bandwidths are the same.

15. A method of operating a communications device comprising:
- using a first transmit path, the first transmit path comprising a first band pass filter operating at a first frequency band having a first bandwidth;
- using a second transmit path, the second transmit path comprising a second band pass filter operating at a second frequency band having a second bandwidth, the second frequency band being directly adjacent to the first frequency band and the second bandwidth being less than the first bandwidth, the first and second frequency bands comprising a combined transmission frequency band;
- using a first receive path, the first receive path operating at a third frequency band having a third bandwidth;
- using a second receive path, the second receive path operating at a fourth frequency band having a fourth bandwidth, the fourth frequency band being directly adjacent to the third frequency band and the fourth bandwidth being less than the third bandwidth, the third and fourth frequency bands comprising a combined reception frequency band,
- wherein the combined transmission frequency band and the combined reception frequency band are isolated from each other by a bandwidth greater than that of the second frequency band or the fourth frequency band; and
- using a processor coupled to the first and second transmit paths and the first and second receive paths for selecting the first and second frequency bands in the corresponding separate transmit paths for routing and combining respective spectral parts into a single transmit signal, and selecting the third and fourth frequency bands in the corresponding separate receive paths for routing and combining respective spectral parts into a single receive signal.

16. The method of claim 15 further comprising:
- using a first duplex band pass filter to couple the first transmit path and the first receive path to an antenna, the first duplex band pass filter selectively passing the first frequency band for the first transmit path and the third frequency band for the first receive path.

17. The method of claim 16 further comprising:
- using a second duplex band pass filter to couple the second transmit path and the second receive path to the antenna, the second duplex band pass filter selectively passing the second frequency band for the second transmit path and the fourth frequency band for the second receive path.

18. The method of claim 17 further comprising using a switch to selectively couple the first and second duplex band pass filters to the antenna.

19. The method of claim 15 wherein a third receive path comprises a band pass filter for passing a combined bandwidth of the third and fourth frequency bands.

20. The method of claim 15 wherein the first and third bandwidths are the same; and wherein the second and fourth bandwidths are the same.

* * * * *